Aug. 11, 1931.    B. A. MILLER    1,818,640
SEPARATION METHOD AND APPARATUS
Filed Dec. 29, 1926
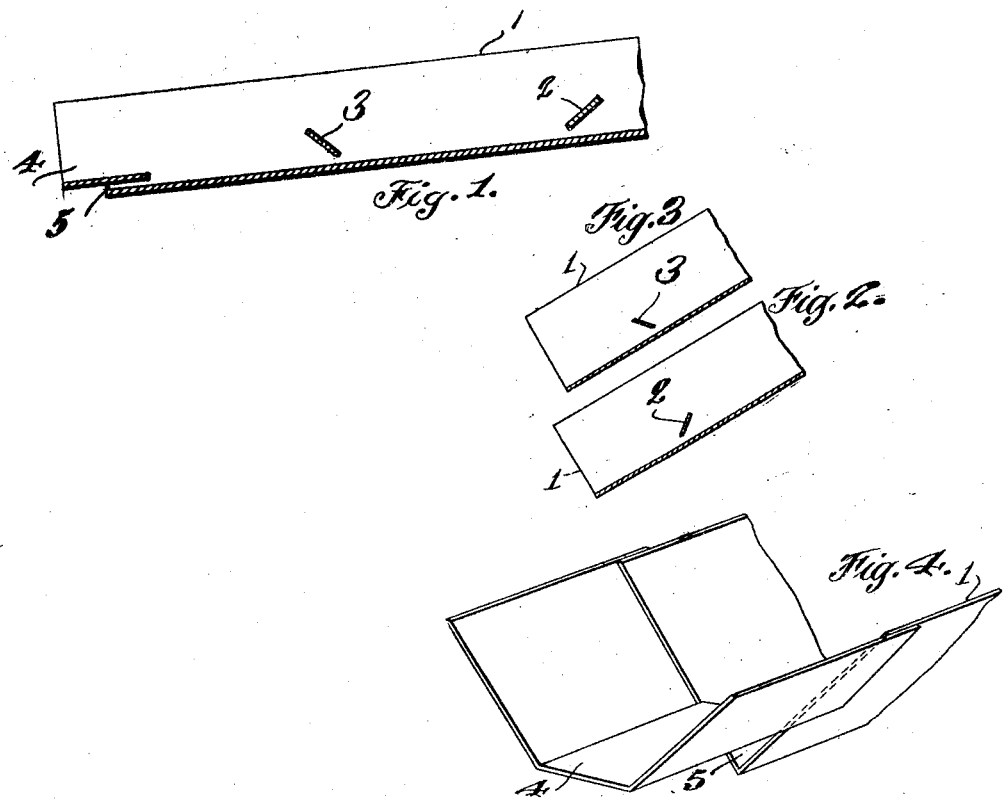

Patented Aug. 11, 1931

1,818,640

UNITED STATES PATENT OFFICE

BIANCA ADAMS MILLER, OF ARDMORE, PENNSYLVANIA

SEPARATION METHOD AND APPARATUS

Application filed December 29, 1926. Serial No. 157,729.

This invention relates to methods of and apparatus for effecting the separation of certain particles, from a mixture of particles, contained in a moving liquid medium, through their varying weight.

One of the objects is to provide a novel concentrating means, having greater efficiency than those in use, with low installation and operating costs.

In the accompanying drawings, illustrating a preferred form of apparatus for carrying out my invention, Fig. 1 is a section of a flume having a converging bottom, with riffles applied therein, and a double discharging means.

Fig. 2 is a portion of a sluice showing a riffle inclined upwardly towards the flow.

Fig. 3 is a similar view showing a riffle inclined in an opposite direction.

Fig. 4 is a perspective of the tail end of a sluice.

Referring to the drawings, numeral 1 indicates a sluice having a converging bottom, inclined longitudinally. Numeral 2 is a riffle inclined upwardly towards the flow. Numeral 3 denotes a similar riffle inclined in an opposite direction. Numeral 4 is an upper discharge at the tail end of sluice 1, while a lower discharge, which is indicated by numeral 5, is formed by the bottom of said sluice. When the water and ore pulp, which pass through flume 1, reach riffle 2, of Fig. 1, the flow is momentarily checked and partly thrown upstream. Resuming its former course, it then encounters riffle 3, which offers less resistance, and this successive baffling forces the concentrate to the bottom, while the lighter, or waste material is kept in suspension until it off-flows. Thus said riffles cause both sequential and varying degrees of resistance. The material should be of a relatively dilute condition, to permit neutralization of the flow by the riffles, thereby effecting concentration of the heavier particles. The concentrate moves progressively forward at the apex of the flow where it is undisturbed by the agitation above, and is discharged at the end of sluice 1 through the lower outlet 5. The waste material off-flows through the upper outlet 6.

I claim:

1. The herein described method, which consists in mixing the material to be separated with a liquid concentrating medium, causing said material and liquid to flow in a form such that the bottom of the flow shall be converging, producing a successive baffling so as to create stream reversals of pronounced difference in resistance said reversals acting in unison, and discharging the concentrate and waste through separate outlets at the tail end of the flow.

2. Apparatus for carrying out the method hereinbefore claimed comprising a sluice having a converging bottom said sluice inclined longitudinally and said sluice provided with riffles inclined oppositionally one from another within said sluice.

In testimony whereof, I have hereunto signed my name.

BIANCA ADAMS MILLER.